United States Patent [19]

Reimer

[11] Patent Number: 4,480,808
[45] Date of Patent: Nov. 6, 1984

[54] CABLE CLAMP

[75] Inventor: William A. Reimer, Wheaton, Ill.

[73] Assignee: GTE Automatic Electric Inc., Northlake, Ill.

[21] Appl. No.: 432,236

[22] Filed: Oct. 1, 1982

[51] Int. Cl.³ ............................................. F16L 3/10
[52] U.S. Cl. .................................. 248/73; 24/115 R; 24/459
[58] Field of Search ................. 24/115 G, 115 R, 324, 24/326, 136 R, 122.3, 374, 375, 459, 522, 524, 526, 527, 528, 628, 629, 115 H; 248/73, 74.7, 316.8; 339/47 R, 97 R, 210 R, 210 M, 103 B, 103 C

[56] References Cited

U.S. PATENT DOCUMENTS

| | | | |
|---|---|---|---|
| 1,079,445 | 11/1913 | Smith | 248/73 |
| 2,915,267 | 12/1959 | Kagsing | 24/17 R X |
| 3,842,392 | 10/1974 | Aldridge et al. | 339/47 R |
| 3,894,706 | 7/1975 | Mizusawa | 248/73 X |
| 4,095,862 | 6/1978 | Hatch | 339/97 R X |
| 4,118,838 | 10/1978 | Schiefer et al. | 24/115 G X |
| 4,221,445 | 9/1980 | Fleischhacker et al. | 339/97 R X |
| 4,283,104 | 8/1981 | Pemberton | 339/97 R |

FOREIGN PATENT DOCUMENTS 1194026  11/1959  France ............................... 24/115 R Primary Examiner—William E. Lyddane
Assistant Examiner—James R. Brittain
Attorney, Agent, or Firm—Robert J. Black; Peter Xiarhos

[57] ABSTRACT

A device for clamping a cable or similar article comprising two identical members. A pair of positioning arms and the latch of one clamp member engage positioning arm guides and a catch of the other member and vice-versa. Both clamp members together retain and hold the cable. The clamp may be mounted to a panel via an optionally provided mounting anchor connected to the base of each clamp member.

10 Claims, 3 Drawing Figures

4,480,808

CABLE CLAMP

BACKGROUND OF THE INVENTION

The present invention relates to clamping devices and more particularly to a clamping device for securing a cable.

Clamping devices are very well known to those skilled in the art. U.S. Pat. No. 2,915,267, issued Dec. 1, 1959, to Kaysing teaches construction of a wire holder including a base member formed with a U-shaped wire receiving seat and a generally U-shaped top member serving to clamp the wire or wires against the seat. The base member is provided with a screw receiving hole to permit attachment of the wire holder to a panel wall or similar structural member. Ratchet teeth are provided on the base and top members to retain the members in engagement about the clamped wires. This type of wire holding arrangement, while operating in a generally satisfactory manner, requires the manufacture and stocking of two uniquely designed and separate members. Additionally, longitudinal motion of the clamped wires may cause the top member to slide relative to the base member in the direction of the ratchet teeth thus inadvertently releasing the clamp.

U.S. Pat. No. 4,118,838, issued Oct. 10, 1978, to Schiefer, et al. teaches clamping of cables or pipes using a clamp having an open top box shaped base portion with U-shaped openings in two opposite sides for receiving the member to be clamped. A generally U-shaped fastening clip sized to fit within the box shape base member has leg portions which are toothed on their outer surfaces and engage similarly toothed inner surfaces of the base member. Such an arrangement while operating generally satisfactorily requires the design, fabrication, and stocking of two unique parts.

Yet another design described in U.S. Pat. No. 4,295,618, issued Oct. 20, 1981, to Morota, et al. teaches a device for fixing a pipe, rod, or other elongated object to a panel. The device includes a panel mounting anchor on one side of a base, the other side including a pair of vertical walls forming an upwardly diverging U-shaped housing portion. A fitting portion is provided to be folded around the fixed object and pushed into the housing where it is retained by pawls. Flexible supporting portions are provided to limit movement of the fitting portion longitudinally in the direction of the pawls, and to permanently affix the fitting portion to the base portion thus forming a unitary structure.

SUMMARY OF THE INVENTION

The present invention provides a novel clamp for securing a cable or similar structure such as a pipe, conduit, or rod. The clamp of the present invention is assembled from two identical clamp members adapted for complementary engagement when the second clamp member is rotated end for end about a clamping axis passing through the center of the clamped cable. Accordingly, each clamp member has a base portion positioned proximate the clamped cable and opposite the second clamp member's base portion. A latch is attached to the base portion and extends past one side of the clamped cable to engage a catch formed in the base of the second clamp member, and vice-versa. A pair of positioning arms are attached to the base portion parallel to the latch arm and spaced apart on the side of the base portion opposite the latch arm. The positioning arms engage positioning arm guides formed in the corresponding clamp member's base portion adjacent the latch arm. The positioning arms and positioning arm guides cooperate to prevent lateral movement of the clamp members and to retain the latch and catch members in engagement. The positioning arms additionally include a cable engaging surface generally perpendicular to the positioning arm and parallel to the base portion to engage the clamped cable when the clamp members are closed and latched around the cable.

Optionally attached to each base portion on the side away from the clamped cable is a headed mounting anchor. The mounting anchor of one clamp member may engage an opening in a planar surface to mount the clamp member to the surface.

DESCRIPTION OF THE PREFERRED EMBODIMENT

Figure 1:
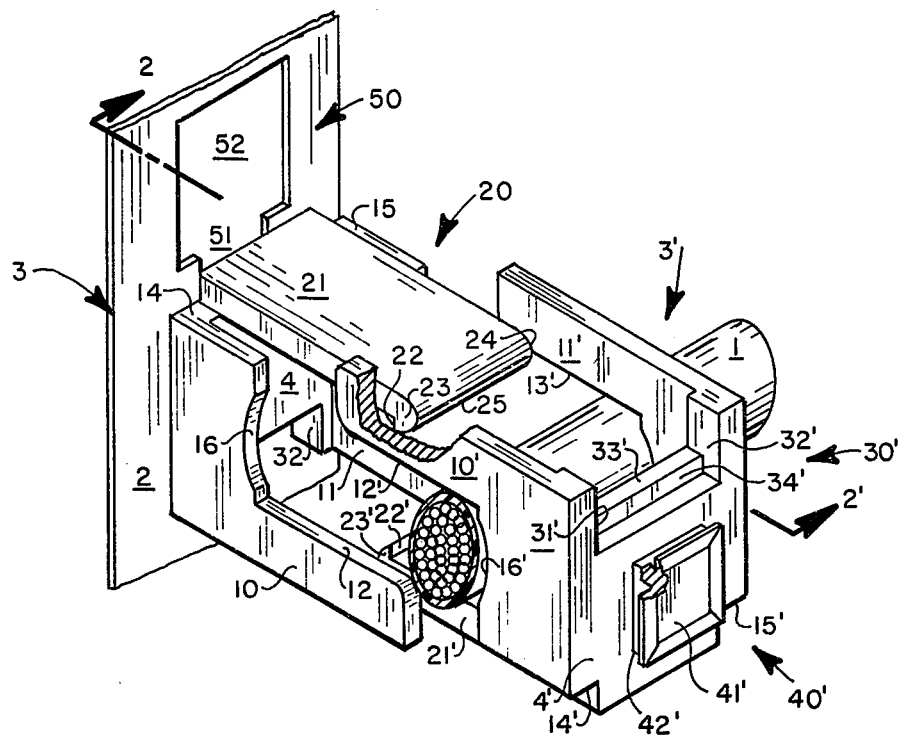
FIG. 1 shows a perspective view of the subject invention with the complementary clamp members positioned to be engaged around a cable.
Figure 2:
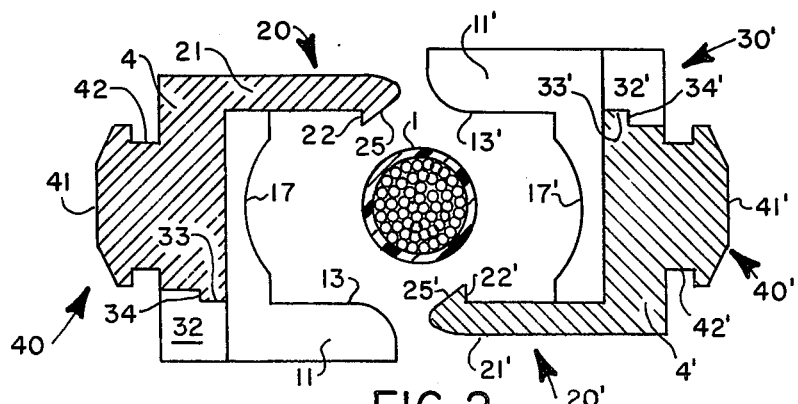
FIG. 2 is a cross-sectional view of FIG. 1 taken generally along the line 2—2 of FIG. 1.
Figure 3:
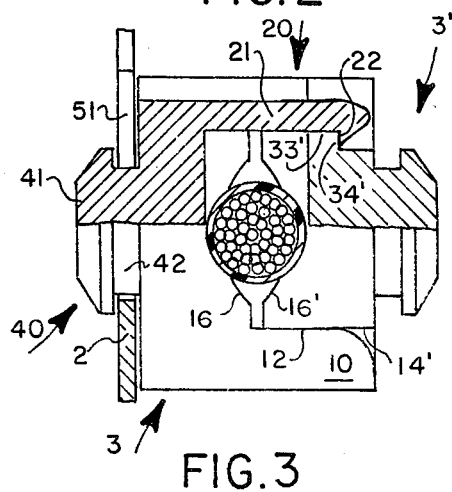
FIG. 3 is a partial sectional view taken generally along the line 2—2 of FIG. 1 showing the clamp members engaged about the clamp cable.

Referring now to FIGS. 1-3, there is shown a cable clamp in accordance with the present invention. As shown in the various figures, the cable clamp includes a first clamp member having parts indicated with unprimed numbers, and a second clamp member identical to the first, having parts indicated with primed numbers. The second clamp member is positioned in FIGS. 1-3 rotated end for end from the orientation of the first clamp member about an axis passing through the center of a clamped cable 1.

Referring now to FIG. 1, the clamp member of the preferred embodiment will be described by generally referring to elements of the first clamp member. Elements of the second clamp member add a prime to the corresponding first clamp member number as noted above.

The clamp member of the preferred embodiment includes a rigid planar base 4 to which are attached on an inward side of the base 4 a pair of positioning arms 10 and 11. The positioning arms 10 and 11 are generally "L" shaped having a body portion of rectangular cross-section extending generally perpendicularly from the base 4. The positioning arms 10 and 11 each include a respective inner guide engaging surface, numbered 12 and 13 respectively, both engaging surfaces lying in a common positioning arm plane plane which is parallel to the axis of the clamped cable and perpendicular to the base 4. The positioning arms 10 and 11 also include a foot portion of rectangular cross-section extending adjacent and parallel to the base 4 in a direction perpendicular to the clamping axis. A pair of inward facing curved cable engaging surfaces 16 and 17 are provided in the foot portion of the positioning arms 10 and 11 to grasp the clamped cable when the clamp of the subject invention is assembled.

A latch 20 is attached in a perpendicular orientation to and on the inward side of the base 4. The latch 20 includes a latch arm 21 of rectangular cross section having a pair of opposing latch side surfaces 23 and 24, and an inwardly extending ledge including a catch engaging surface 22 generally parallel to the base 4. The latch 20 also includes a sloping surface 25 extending from an inner edge of the catch engaging surface 22 in a divergent direction to a free end of the latch 20.

The base 4 further includes two positioning arm guide recesses each having positioning arm guide surfaces numbered 14 and 15, both guide surfaces lying in a common plane parallel to the axis of the clamped cable and perpendicular to the base 4. The guide surfaces 14 and 15 are adapted to engage positioning arms 10' and 11' of the second clamp member via positioning arm inner guide engaging surfaces 12' and 13', respectively.

A recess 30 (partly shown) is formed in the base 4 intermediate the positioning arms 10 and 11 and includes a pair of opposite side walls 31 (not shown) and 32 both parallel to each other and parallel to the axis of the clamped cable. The side walls 31 and 32 are spaced apart to closely receive the latch side surfaces 23 and 24 of the latch 20 therebetween. The recess 30 also includes a catch 33 having an engaging surface 34.

Clamp member 3 includes a mounting arrangement comprising, in the preferred embodiment, mounting anchor 40 having head portion 41 and neck portion 42, both of square cross-section and formed integrally with the base 4. Clamp anchor 40 is adapted, in the preferred embodiment, for receptive engagement within keyhole shaped aperture 50 having an enlarged engaging portion 52 and a narrowed retaining portion 51 sized large enough to permit passage of anchor neck portion 42 but inhibit passage of anchor head portion 41. It will be appreciated by those skilled in the art that other mounting arrangements may be employed equally effectively without departing from the spirit of the invention.

Referring now to FIG. 1, the cable clamp of the subject invention is arranged to retain cable 1 to mounting surface 2 by orienting first clamp member 3 such that base 4 is generally parallel to clamping surface 2 and clamp anchor 40 faces aperture 50. Clamp anchor 40 is then inserted through enlarged portion 52 of clamping aperture 50 and slid downward to engage clamp aperture narrowed portion 51 behind clamp anchor head 41 thus positioning aperture narrowed portion 51 intermediate anchor head 41 and base 4. In this position anchor neck portion 42 abuts the edges of narrowed portion 51 preventing rotational movement of clamp member 3.

Following the mounting of first clamp member 3 to panel 2, cable 1 is positioned adjacent to cable engaging surfaces 16 and 17 along the cable clamping axis intermediate latch 20 and the body positions of positioning arms 10 and 11. Finally FIG. 2, second clamp member 3' is oriented identical to first clamp member 3 but rotated end for end about the clamping axis. Second clamp member 3' is then pressed into engagement with first clamp member 3 to engage and retain cable 1. In this regard, inner guide engaging surfaces 12 and 13 of positioning arms 10 and 11 engage and slide along positioning arm guide surfaces 14' and 15' of second clamp member 3' and inner guide engaging surfaces 12' and 13' of positioning arms 10' and 11' engage and slide along positioning arm guide surfaces 14 and 15 of first clamp member 3. As clamp members 3 and 3' are pressed into engagement, cable clamping surfaces 16 and 16', and 17 and 17' contact cable 1. The continued application of force will then cause clamping surfaces 16 and 16', and 17 and 17' to deflect and firmly grip cable 1 thus preventing motion of cable 1 relative to cable clamp members 3 and 3'. Simultaneously, latch sloping surfaces 25 and 25' contact catches 33' and 33 respectively deflecting latches 20 and 20' outwardly. As clamp members 3 and 3' are pressed to their final clamping positions, catch engaging surfaces 22 and 22' pass catches 33' and 33 respectively. Latches 20 and 20' then close around catches 33' and 33, and catch engaging surfaces 22 and 22' engage catch surfaces 34' and 34, respectively, thus securing clamp members 3 and 3' in locked engagement with each other.

Referring now to FIG. 3, there is shown a partial cross-section of the subject invention along the line 2—2 of FIG. 1 for the purpose of showing in a clear manner how latches 20 and 20' are retained in engagement with catches 33' and 33, respectively. In this regard, latch 20 having catch engaging surface 22 at the distant end of latch arm 21 engages catch surface 34' of catch 3' thus preventing horizontal motion of clamp member 3' relative to clamp member 3. Vertical motion of clamp member 3' relative to clamp member 3 in the upward direction is prevented by action of catch 33' acting against latch arm 21, and in the downward direction by action of guide surfaces 14' and 15' (not shown) against surfaces 12 and 13 (not shown) of positioning arms 10 and 11 (not shown) respectively. Also shown in FIG. 3 is anchor 40 having neck portion 42 extending through panel aperture narrowed portion 51 and attached to anchor head 41 thus mounting clamp member 3 to panel 2.

Refering back to FIG. 1, longitudinal movement of second clamp member 3' with respect to first clamp member 3 is prevented in a direction parallel to the axis of the clamped cable by the action of the side surfaces 23 and 24 of the latch 20 against the sidewalls 31' and 32' of the recess 30' and the side surfaces 23' and 24' of the latch 20' against the side walls 31 and 32 of the recess 30.

The present invention has been described with reference to a specific embodiment thereof for the purpose of illustrating a manner in which the invention may be used to advantage. It will be appreciated by those skilled in the art that numerous modifications of the present invention can be made without departing from the spirit of the invention which shall be limited only by the scope of the claims appended hereto.

What is claimed is:

1. Cable clamp means for securing a cable to an adjacent structure comprising:

first and second identical clamp members each adapted to be positioned for complementary engagement with the other, each clamp member including a base portion;

a pair of positioning arms spaced apart and attached to said base portion;

a pair of positioning arm guides formed in said base portion, said positioning arm guides of said first clamp member each receiving one of said positioning arms of said second clamp member and said positioning arm guides of said second clamp member each receiving one of said positioning arms of said first clamp member;

latch means attached to said base portion;

catch means attached to said base portion, said latch means of said first clamp member engaging said catch means of said second clamp member, said latch means of said second clamp member engaging said catch means of said first clamp member;

a cable engaging surface included in each of said positioning arms, said cable engaging surfaces associated with each clamp member positioned opposite one another and in contact with said cable, to grip and thus to secure said cable; and connecting means formed integrally with said base portion, said connecting means serving to mount said base portion to said adjacent structure.

2. Cable clamp means as claimed in claim 1, wherein: said base portion is of planar construction including an inner surface to which are attached said positioning arms and said latch means, and an outer surface to which is attached said connecting means, said connecting means comprising a head portion attached to said base portion by a neck portion.

3. Cable clamp means as claimed in claim 2, wherein: said head portion is adapted to fit through an enlarged upper portion of a keyhole shaped aperture in a planar sheet, said neck portion includes a square cross-section having opposite sides adapted to slidingly fit a narrowed lower portion of said keyhole shaped aperture, and said base portion is mounted to said planar sheet by inserting said head portion through said enlarged upper portion of said keyhole shaped aperture and sliding said neck portion into said keyhole aperture narrowed lower portion.

4. Cable clamp means as claimed in claim 1, wherein: said positioning arms extend perpendicular from said base portion and adjacent to a first side of said cable.

5. Cable clamp means as claimed in claim 4, wherein: said positioning arms are of rectangular cross-section, each including an inner surface located in a common positioning arm plane.

6. Cable clamp means as claimed in claim 5, wherein: said positioning arm guides each include a guide surface, said guide surfaces located in a common plane oriented perpendicular to said base portion, said positioning arm inner guide engaging surfaces of said first clamp member contacting said positioning arm guide surfaces of said second clamp member and said positioning arm inner guide engaging surfaces of said second clamp member contacting said positioning arm guide surfaces of said first clamp member to prevent lateral movement of said first and second clamp members in a direction to maintain said positioning arms in contact with said positioning arm guides.

7. Cable clamp means as claimed in claim 6, wherein: said latch means comprises a latch arm of rectangular cross-section extending perpendicularly from said base portion and adjacent a second side of said cable, and an inwardly extending ledge attached to the free end of said latch arm.

8. Cable clamp means as claimed in claim 7, wherein: said catch means comprises a recess formed in said base portion including a pair of sides and a latch engaging surface parallel to said base portion, said latch ledge of said first clamp member engaging said latch engaging surface of said second clamp member and said latch ledge of said second clamp member engaging said latch engaging surface of said first clamp member to retain said cable engaging surfaces in opposed gripping contact with said cable; and said positioning arms of each clamp member cooperating with said corresponding positioning arm guides of the other clamp member to urge said latch ledges of each clamp member into engagement with said latch engaging surfaces of the other clamp member.

9. Cable clamp means as claimed in claim 8, wherein: said recess sides are parallel to each other, perpendicular to an axis passing through the center of said cable, and spaced apart to closely receive said latch arm free end; said latch arm free end of each clamp member cooperating with said recess sides of the other clamp member to prevent movement of said clamp members longitudinally along said axis.

10. A clamp device for securing a cable to a surface comprising:

first and second identical clamp members adapted to be positioned for complementary engagement about a clamping axis passing through the center of said cable, each clamp member comprising a rigid base portion including inner and outer surfaces;

a mounting anchor comprising a head portion of square cross-section integrally formed with said base portion outer surface and including a neck portion of reduced square cross-section compared to said head portion, said anchor adapted to rigidly engage a keyhole shaped aperture in said surface;

a pair of generally "L" shaped positioning arms spaced apart on one side of said cable, each arm having a body portion extending perpendicularly from said base portion in the direction of said cable and including a positioning arm inner guide engaging surface, both positioning arm inner guide engaging surfaces located in a plane parallel to said clamping axis and perpendicular to said base, said positioning arms further including a foot portion positioned adjacent said base portion and perpendicular to said clamping axis, said foot portion including an inward facing curved cable engaging surface;

a pair of positioning arm guides formed in said base portion, each guide including a positioning arm guide surface located in a plane parallel to said clamping axis and perpendicular to said base, said positioning arm inner guide engaging surfaces of each clamp member engaging said positioning arm guide surfaces of the other clamp member to prevent lateral movement of said clamp members in a direction to maintain said positioning arm inner guide engaging surfaces in contact with said positioning arm guide surfaces;

a latch arm extending perpendicularly from said base portion in the direction of said cable and including an inwardly extending ledge at the free end thereof; and a catch recess formed in said base portion including a ledge engaging surface, said catch ledge of each clamp member engaging said ledge engaging surface of the other clamp member to bring said cable engaging surfaces into opposed gripping engagement with said cable to secure said cable, said catch recess further including a pair of parallel side surfaces spaced apart to receive said latch arm free end, said latch arm free end of each clamp member cooperating with said parallel surfaces of the other clamp member to prevent movement of said clamp members longitudinally along said clamping axis, and said positioning arms of each clamp member cooperating with said positioning arm guides of the other clamp member to retain said latch ledges of each clamp member engaged with said catch ledge engaging surface of the other clamp member.

* * * * *